US007145164B2

(12) United States Patent
Lay et al.

(10) Patent No.: US 7,145,164 B2
(45) Date of Patent: Dec. 5, 2006

(54) MEDIA ROUTING CONTROL BASED ON A CHARACTERISTIC OF THE MEDIA

(75) Inventors: D. Travis Lay, Horseshoe Bend, ID (US); Curtis Reese, Boise, ID (US); Willard W. Bradburn, Nampa, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 286 days.

(21) Appl. No.: 10/693,387

(22) Filed: Oct. 24, 2003

(65) Prior Publication Data

US 2005/0087706 A1 Apr. 28, 2005

(51) Int. Cl.

| | |
|---|---|
| ***G01N 21/86*** | (2006.01) |
| ***B07C 5/00*** | (2006.01) |
| ***B65H 29/00*** | (2006.01) |
| ***B65H 7/02*** | (2006.01) |
| ***B65H 39/10*** | (2006.01) |

(52) U.S. Cl. .................. 250/559.4; 209/552; 271/185; 271/265.02; 271/291

(58) Field of Classification Search ................ 271/280, 271/291, 301, 184, 185, 265.02, 265.03; 250/559.44, 559.4, 559.16, 559.17, 559.18; 209/552, 583

See application file for complete search history.

(56) References Cited

U.S. PATENT DOCUMENTS

| | | | | |
|---|---|---|---|---|
| 3,938,663 | A | | 2/1976 | Carnes et al. |
| 4,025,420 | A | | 5/1977 | Horino |
| 4,345,150 | A | | 8/1982 | Tamura et al. |
| 4,483,124 | A | * | 11/1984 | Ohba et al. .................... 53/54 |
| 4,577,104 | A | | 3/1986 | Sturm |
| 4,710,963 | A | * | 12/1987 | Chapman et al. ........... 382/112 |
| 4,747,911 | A | | 5/1988 | Polson |
| 4,755,678 | A | | 7/1988 | Izatt et al. |
| 4,771,631 | A | | 9/1988 | Lehtikoski et al. |
| 5,049,924 | A | | 9/1991 | Moro et al. |
| 5,182,722 | A | | 1/1993 | Hain |
| 5,394,247 | A | | 2/1995 | Vahey et al. |
| 5,831,741 | A | | 11/1998 | Milillo |
| 5,934,140 | A | | 8/1999 | Jackson et al. |
| 5,986,457 | A | | 11/1999 | Kayani |
| 6,028,318 | A | | 2/2000 | Cornelius |
| 6,040,584 | A | | 3/2000 | Liu et al. |
| 6,167,231 | A | * | 12/2000 | Blackman et al. .......... 399/364 |
| 6,355,931 | B1 | | 3/2002 | Hernandez et al. |
| 6,394,676 | B1 | | 5/2002 | Dresher |
| 6,396,070 | B1 | | 5/2002 | Christensen et al. |
| 6,654,573 | B1 | | 11/2003 | Carlson et al. |
| 6,718,145 | B1 | | 4/2004 | Ohta et al. |
| 6,836,627 | B1 | * | 12/2004 | Kretschmann et al. ........ 399/82 |

FOREIGN PATENT DOCUMENTS

| | | |
|---|---|---|
| GB | 2093809 | 9/1982 |

* cited by examiner

*Primary Examiner*—Georgia Epps
*Assistant Examiner*—Don Williams

(57) ABSTRACT

A media routing control device and method for qualifying media for use with a sheet-fed device includes a sensor configured to detect a characteristic of a media sheet. The device further includes a usable sheet media path and an unusable sheet media path. A sheet-inverting duplexing path inverts the media sheet when necessary and a controller controls the routing of the media sheet along one of the media paths according to the detected characteristic.

20 Claims, 4 Drawing Sheets

MEDIA ROUTING CONTROL BASED ON A CHARACTERISTIC OF THE MEDIA

FIELD OF THE INVENTION

The present invention relates to a method and apparatus for determining the acceptability of previously used media for use in electronic devices. More specifically, the present invention relates to methods and devices for screening sheets of previously used media for use in electronic devices.

BACKGROUND OF THE INVENTION

Sheet-fed devices, such as printers, copiers, facsimile machines, multifunction devices, and the like, sometimes use previously used media, such as previously printed-on paper. The custom of reusing media may be useful for draft copying or printing where the appearance of the final document is not important. One of the most common problems with this reuse of media is that the media may be reprinted on a side that has been previously printed on. As a result, in order to reuse this previously used media the operator inserting the media in the machine must properly orient the reused media in the media tray so that the device can print on the unused side of the media. This is sometimes difficult to determine and inadvertent printing on a previously used side of the media may result either from a single piece of media that is inserted improperly, or from an entire stack of media that may have been inserted upside down.

Printing on the previously used side of the media results in increased printing or copying time by having to reprint or recopy on another piece of properly oriented media. In addition, printing on the previously used side of the media results in excessive use of a print agent such as ink or toner. Consequently, the improper routing of previously used media can result in reduced productivity and increased cost of printing on previously used media. In some environments input media is often loaded in sporadic increments by various users; the result being inconsistent media routing.

BRIEF SUMMARY OF THE INVENTION

In one embodiment of the present invention, a media routing control device includes a sensor configured to detect the presence of content on a media sheet and a controller coupled to the sensor and configured to control routing of the media sheet according to the presence of content on the media sheet. The device further includes a media path for usable and unusable media, and a media-inverting duplexing path configured to invert the media sheet when directed by the controller.

In another embodiment of the present invention, a sheet-fed device includes an input tray configured to hold a plurality of media sheets and a media path including one of an imaging path which further includes imaging circuitry operably configured therewith and a path for unusable media. The media path also includes a media-inverting duplexing path to properly orient a media sheet. The sheet-fed device further includes media sensing circuitry for receiving one media sheet from the input tray and is configured to determine print-impairing characteristics on the one media sheet and to convey the one media sheet to the media path.

In a further embodiment of the present invention, a method for qualifying media for use with a sheet-fed device includes selecting a media sheet from an input tray, transporting the media sheet past sensing circuitry and collecting and analyzing data from sensing circuitry for print-impairing characteristics. The media sheet is routed to a media path for usable media when the data from either side of the media sheet qualifies the media sheet for use by the sheet-fed device and routes the media sheet to a media-inverting duplexing path when the data from a first side of the media sheet fails to qualify the media sheet.

In yet a further embodiment of the present invention, a method for qualifying media sheets includes sensing for a first presence of previous printing characteristics on a first side of a media sheet and routing the media sheet to a media path for usable media when the first presence is less than an unusable threshold. When the first presence exceeds the usable threshold then the method inverts the media sheet to a second side and senses for a second presence of previous printing characteristics on a second side of the media sheet. The media sheet is routed to the media path for usable media when the second presence is less than the unusable threshold and routed to a media path for unusable media when the second presence exceeds the unusable threshold.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

Figure 1:
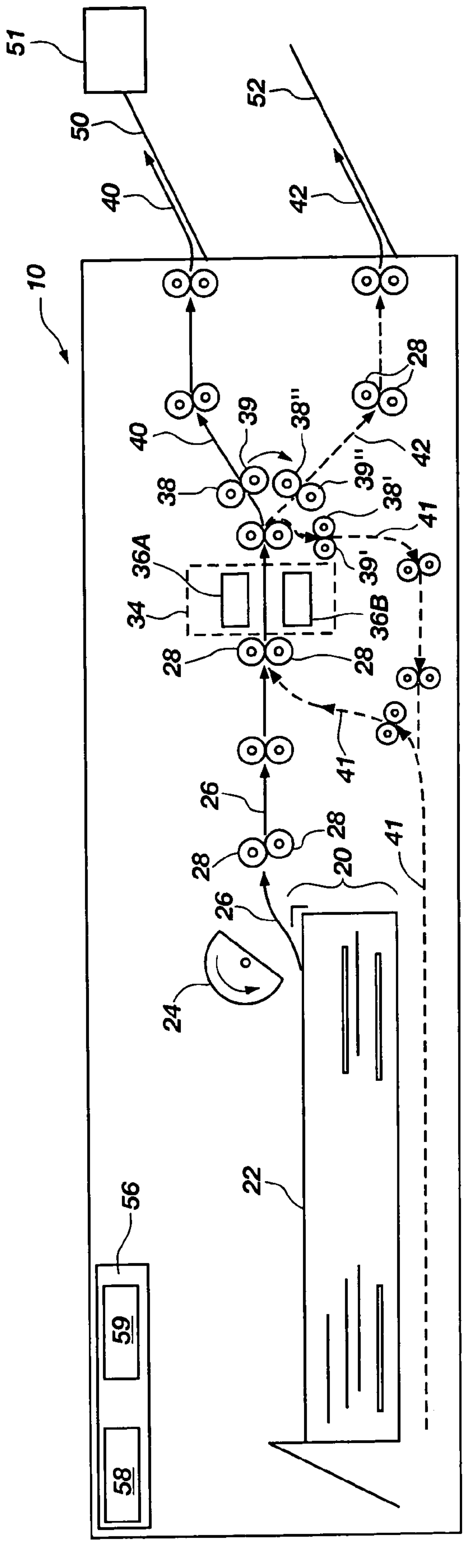
FIG. 1 is a partial sectional side view of a media routing control device in accordance with one embodiment of the present invention.

FIG. 1 is a partial sectional side view of one embodiment of a sheet media routing control device 10 in accordance with the present invention. Media routing control device 10 comprises an input tray 20, an input path 26, sensor/scanner circuitry 34, a usable media path 40, a media-inverting duplexing path 41, and a media discharge path 42. The input tray 20 may be configured to hold unused and/or used media or to be used with a sheet-fed device, such as sheet-fed imaging device 140 of FIG. 4. The input tray 20 may be configured to hold a single sheet of media, or alternatively, the tray may be configured to hold a large capacity of media. The media sheets 22 may be paper, transparencies, or other media stock of the general dimensions conventionally used with sheet-fed devices such as laser printers, inkjet printers, dye-transfer printers, facsimile machines, copiers, scanners, and the like.

The media routing control device 10 may also include path control elements to transport and guide the media sheets 22, one at a time, along the input path 26 past the sensor circuitry 34 and along the usable media path 40, the media-inverting duplexing path 41, or the media discharge path 42. As shown in FIG. 1, path control elements may include a feed roller 24 configured to pick up the top sheet from the stacked media sheets 22 and advance it to a pair of transport rollers 28 (multiple pairs shown). Multiple pairs of transport rollers 28 may be configured to transport sheets along the input path 26, the usable media path 40, the media-inverting duplexing path 41, or the media discharge path 42. The media routing control device 10 may also include sheet guides (not shown) configured to guide sheets along the paths 26, 40, 41, and/or 42 while the sheets are being conveyed by pairs of transport rollers 28. The media routing control device 10 may also include sheet guides (not shown) coupled to a pair of path selection rollers 38 and 39 configured to selectively move between the usable media path 40, the media-inverting duplexing path 41, or the media discharge path 42. FIG. 1 shows the path selection rollers illustrated in various positions as rollers 38, 39; rollers 38', 39'; and rollers 38", 39". As illustrated, rollers 38 and 39 are positioned to pass sheets to the usable media path 40.

FIG. 1 shows the input path 26 passing the media by the sensor circuitry 34 which is shown to contain the sensors 36A and 36B. However, any number of sensors may be used in this circuitry. The sensors 36A and 36B may be positioned proximate the input path 26 to be exposed to or make contact with sheets passing along the input path 26. The sensors 36A and 36B may be positioned above, below, or beside the input path 26. The sensors 36A and 36B may use magnetic, light, or other similar technology for detecting previous printing or other marks on the media sheet or any other of the media characteristics. The number, position, and function for the sensors in the sensor/scanner circuitry 34 are by way of example only, and not by limitation.

The media routing control device 10 may also include output trays 50 and/or 52 configured to receive the media sheets 22 as they are conveyed to the output of the media paths 40 or 42. Output tray 50 may be configured to detachably attach to the media routing control device 10 at the output of the usable media path 40. Output tray 52 may be configured to detachably attach to the media routing control device 10 at the output of the unusable media path 42. Alternatively, the media routing control device 10 may be configured to detachably attach to a sheet-fed device 51 such that sheets passing to the output of the usable media path 40 are fed directly to the sheet-fed device 51 or are passed to an input tray of the sheet-fed device.

The media routing control device 10 may also include an input/output device depicted in FIG. 1 as a control panel 56 comprising a control pad or keypad 58 and a display 59. The control panel 56 may be configured to allow a user of the media routing control device 10 to select the method of operation for the media routing control device 10. Method of operation may include, but is not limited to, automatic operation of the inverting and discharging of the used media if media is unacceptable, manual acceptance or rejection of media for printing, automatic or manual resizing the print job to fit the available space on the media, and the like.

Figure 2:
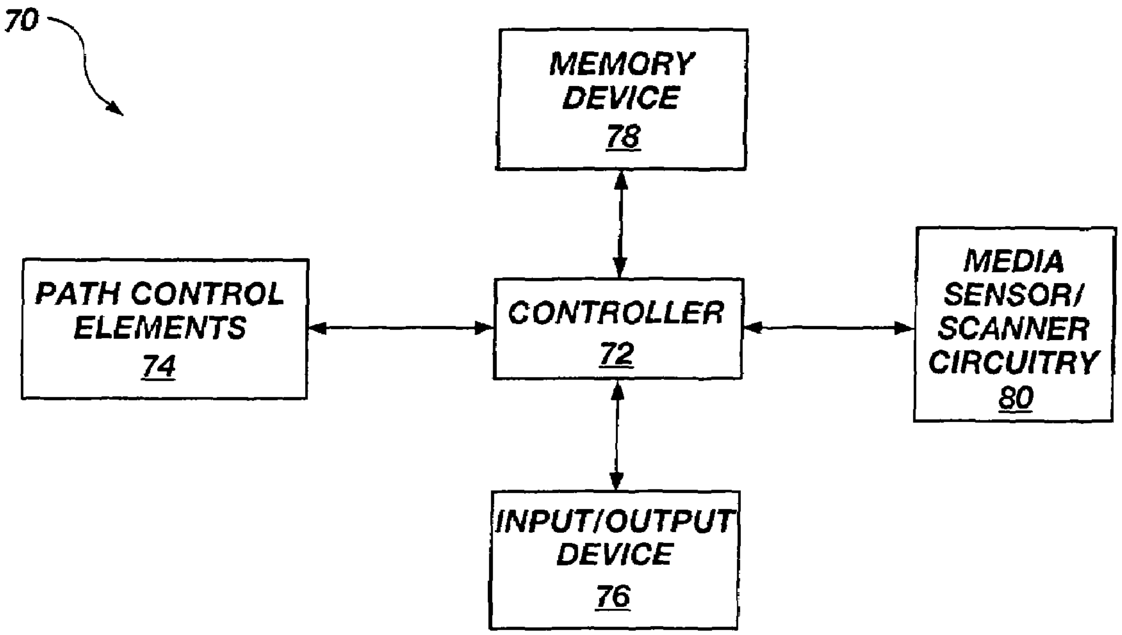
FIG. 2 is a block diagram of electrical circuitry of one embodiment of the present invention.

FIG. 2 is a block diagram of electrical circuitry 70 of one embodiment of the present invention. The electrical circuitry 70 comprises a controller 72 electrically coupled to path control elements 74, an input/output device 76, a memory device 78, and a media sensor/scanner circuitry 80. Path control elements 74 may, by way of example only, be selected from the group comprising input and output media trays, sheet guides, path selection sheet guides, path selection rollers, feed rollers, and transportation rollers. The input/output device 76 may, by way of example only, be selected from the group comprising a switch, a control panel, a processor, a microcontroller, a computer, a memory device and a sheet-fed device. The input/output device 76 may be configured to allow a user to select one or more preset use parameters from the memory device 78. The selection of parameters may also be automatic. For example, a sheet fed device acting as the input/output device 76 may automatically communicate to the controller 72 the parameter to qualify media sheets for use with the sheet-fed device. Alternately, the selection of the previous use/coverage parameters may be manual. For example, a user may provide input to authorize the use of previously used media.

The media sensor/scanner circuitry 80 is configured but not limited to detect printing, marking, or other characteristics on the media page. For example, the media may have dry toner, ink, dirt, or any other mark on the page that would not be conducive to printing. The controller 72 is configured to input the information from the media sensor/scanner circuitry 80 about the status of the media page, input the information from the memory device 78 about settings, or otherwise, and input information from the input/output device 76. Once the controller 72 has input this data, the controller will follow a preset algorithm to control the path control elements 74.

Figure 3:
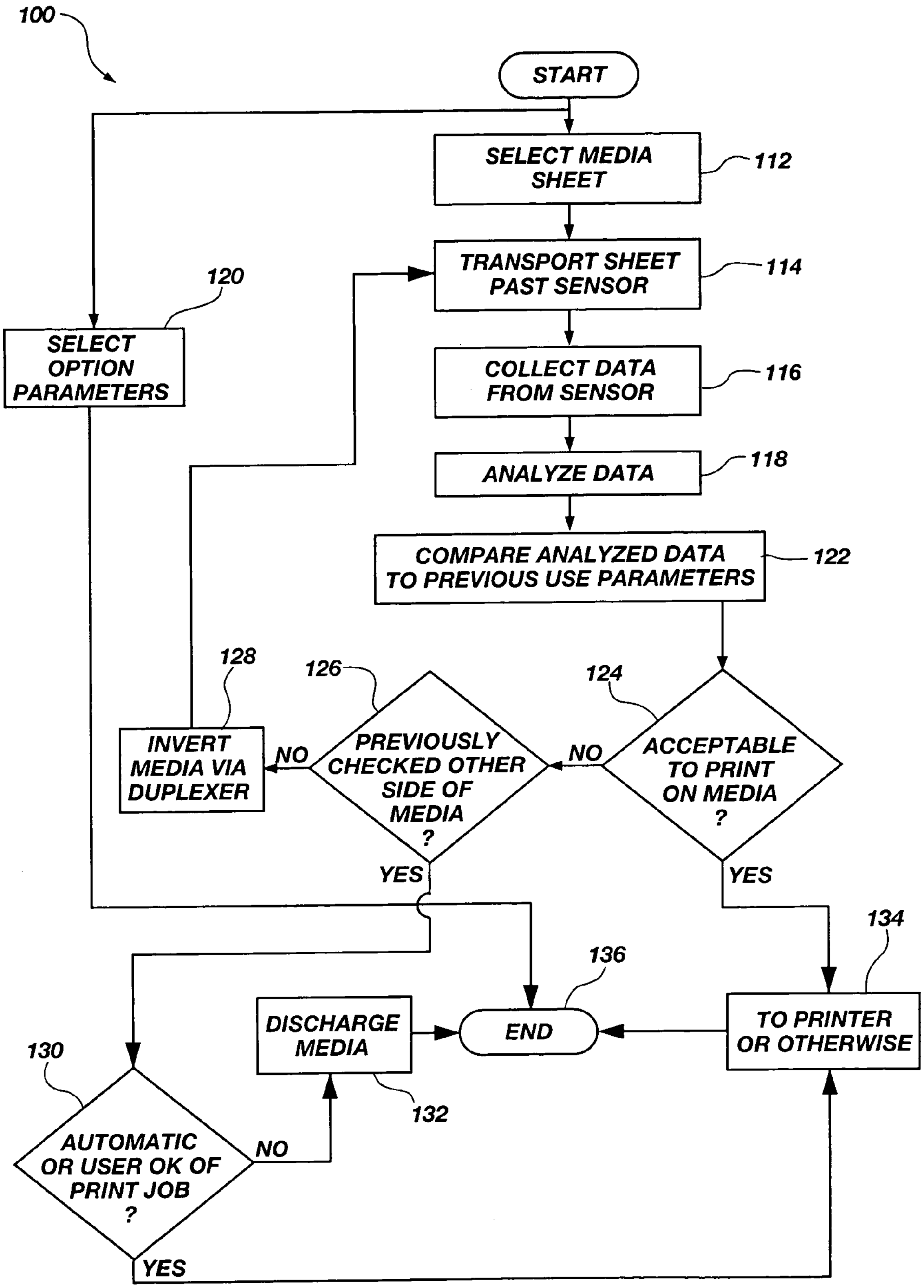
FIG. 3 is a flow diagram illustrating a method for orienting previously used or otherwise marked media properly for printing or other processing in accordance with one embodiment of the invention.

Referring to FIGS. 1, 2 and 3, FIG. 3 is a flow diagram of a method or process 100 illustrating qualification of media sheets according to one embodiment of the present invention. The controller 72 is configured to control the path control elements 74 to select a media sheet 112 and transport 114 the media sheet past the media sensor circuitry 80. A sheet may be selected from a plurality of stacked media sheets 22, input tray 20 and feed roller 24 shown in FIG. 1. The controller may also be configured to prompt the input/output device 76 to select options 120 to be received by the controller 72.

Once the media sheet 22 reaches the media sensor circuitry 80, the controller is configured to collect data 116 from the sensor and to analyze the data 118 to determine if the media sheet has printing or other print-impairing characteristics or markings on the media sheet. The analyzed data is compared to the received previous use parameters 122 to determine whether the media sheet qualifies for printing. Then the controller 72 determines if the media sheet 20 is acceptable 124 to be printed on. If the media sheet 20 is acceptable to be printed on, the controller 72 directs the path control elements 74 to send the media on for processing, such as, but not limited to printing 134. If the media sheet 20 is not acceptable for printing on because it has exceeded an unacceptable threshold value, the controller 72 determines if the other side of the media has already been checked 126. If the other side of the media sheet has not been checked, the controller 72 directs the path control elements 74 to forward the media sheet 128 to the media inverting duplexing path 41. Once the media sheet has been inverted 128, the controller 72 then directs the path control elements 74 to forward the media sheet 114 back past the media sensor circuitry 80. On the other hand, if the other side of the media sheet 20 has already been checked by steps 114–124, the controller 72 may send a signal to the input/output device 76 to have the user accept 130 the media "as is" for printing or to reject the media 132. Additionally, the controller may automatically accept or reject the media for printing 130 depending on the current option parameters input by user 120. If the user or the controller 72 determines that the media is acceptable for printing 130, the controller 72 directs the path control elements 74 to forward the media to the printer or other device 134. On the other hand, if the user or controller 72 determines that the media is not acceptable for printing 130, then the controller 72 directs the path control elements 74 to discharge the media or otherwise prevent the media from being processed 132. Once the media has either been printed/processed 134 or discharged 132, the system ends the algorithm 136 until the device directs the system to start over again.

Figure 4:
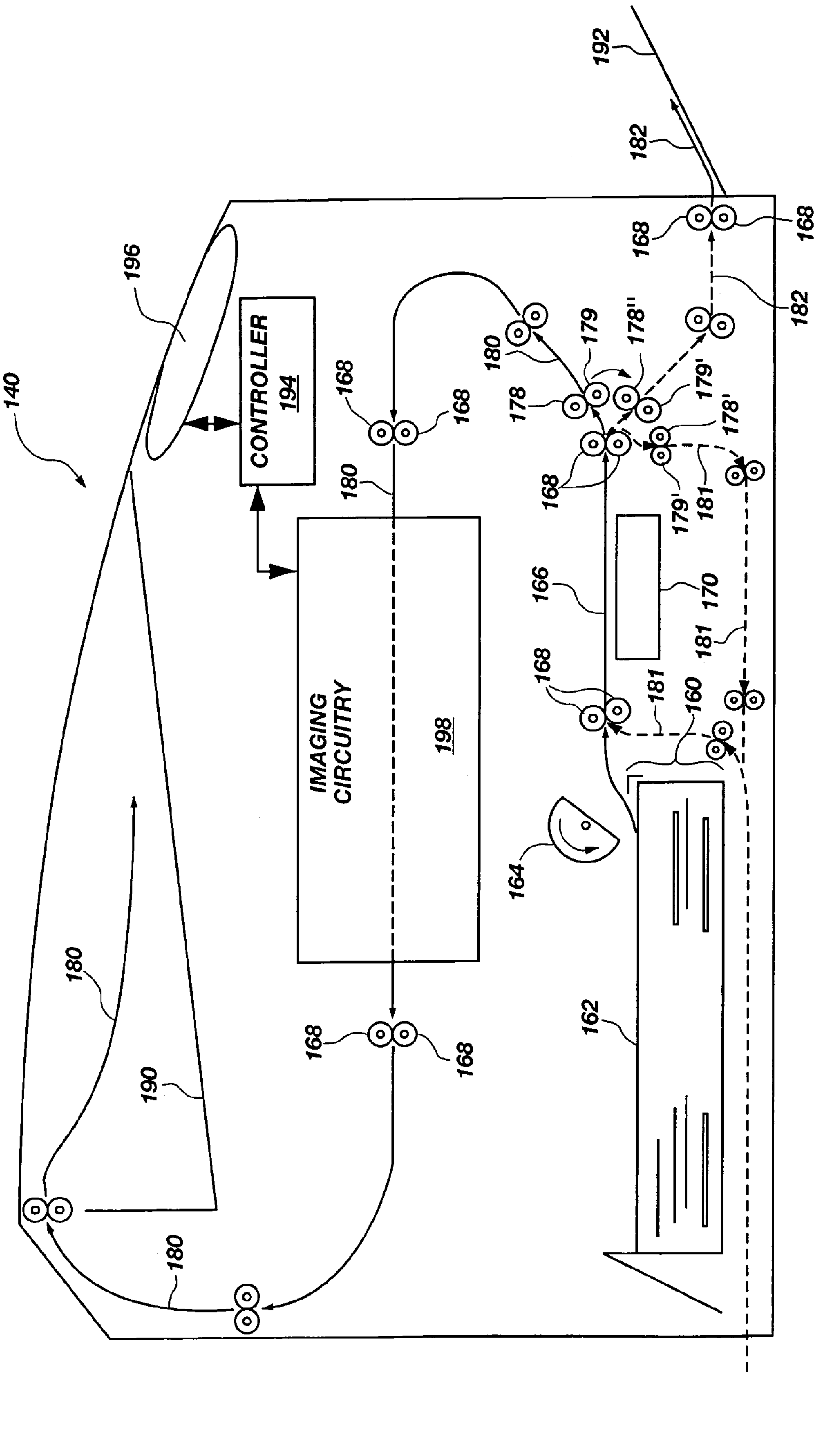
FIG. 4 is a partial sectional side view of a sheet-fed imaging device in accordance with one embodiment of the present invention.

FIG. 4 is a partial sectional side view of a sheet-fed imaging device 140 such as, but not limited to, a multifunction device, laser printer, inkjet printer, dye-transfer printer, facsimile machine, copier, scanner, and the like according to one embodiment of the present invention. The imaging device 140 comprises an input tray 160, an input path 166, media sensor circuitry 170, an imaging path 180, a media-inverting duplexing path 181, an unusable media path 182, a controller 194, and imaging circuitry 198. The input tray 160 may be a high capacity paper tray configured to hold a large number of stacked media sheets or may hold a single sheet 162. The imaging device 140 may also comprise path control elements including a feed roller 164 configured to pick up the top sheet from the stacked media sheets 162 and advance it to a pair of transport rollers 168 (multiple pairs shown). Multiple pairs of transport rollers 168 may be configured to transport the sheet along the input path 166, imaging path 180, media-inverting duplexing path 181, and unusable media path 182. The path control elements may also include sheet guides (not shown), path selection sheet guides (not shown) and path selection rollers 178 and 179, illustrated in various positions as rollers 178, 179; rollers 178', 179'; rollers 178", 179"; configured to selectively move between the imaging path 180, the media-inverting duplexing path 181, and the unusable media path 182. FIG. 4 shows the path selection rollers 178 and 179 positioned to pass sheets to the imaging path 180.

The media sensing circuitry 170 is configured to collect data relative to the media sheets. By way of example only, and not by limitation, the media sensing circuitry 170 is configured to collect data to determine if the media has been printed on or has any marking which would interfere with printing on the media. The media sensing circuitry 170 may have any number and type of sensing/scanning devices to determine the relevant characteristics of the media. The imaging circuitry 198 is electrically coupled to the controller 194 and comprises circuitry for image processing, such as but not limited to, scanning, copying, printing, faxing, or other printed material analysis. The imaging device 140 may further comprise a control panel 196 electrically coupled to the controller 194. The control panel 196 may be configured to allow a user of the imaging device 140 to control imaging processes and to select optional parameters.

The controller 194 is electrically coupled to the media sensing/scanning circuitry which is configured to receive data from the media sensing circuitry 170 relative to the prior use of the media or markings on the media or any other characteristic of the media and then to analyze the data to determine whether the media passing by or through the media sensing circuitry 170 is acceptable for use with the imaging device 140. The controller 194 may comprise a nonvolatile memory device (not shown) configured to store content-based media option parameters which the controller 194 may compare to the input data to qualify the media for use with the imaging device 140. Alternatively, the controller 194 may be configured to receive data/specifications from the control panel 196. The controller 194 is configured to determine if a sheet of media 162 is qualified for use with the imaging device 140 or if the media needs to be inverted via the media-inverting duplexing path 181, or if the media needs to be discharged via the unusable media output path 182. If the media sheet 162 is determined to qualify for printing, the controller 194 is configured to direct the transporting devices to route the media to the imaging circuitry 198 for image processing. After image processing, the transport rollers 168 are configured to pass the qualifying media sheets 162 to the processed media output tray 190.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A media routing control device comprising:
- a sensor configured to detect a characteristic of a media sheet;
- a usable sheet media path;
- an unusable sheet media path;
- a sheet-inverting duplexing path configured to invert the media sheet; and
- a controller electrically coupled to the sensor and configured to route the media sheet to the sheet-inverting duplexing path according to the detected characteristic.

2. The media routing control device of claim 1, further comprising an input/output device electrically coupled to the controller, the input/output device configured to provide at least one previous use parameter to the controller.

3. The media routing control device of claim 2, wherein the at least one previous use parameter includes a threshold of the characteristic to cause the controller to route the sheet to the sheet-inverting duplexing path to invert the sheet.

4. The media muting control device of claim 1, further comprising an input tray configured to supply a plurality of media sheets to the sensor.

5. The media routing control device of claim 1, further configured to detachably attach to a sheet-fed device.

6. The media routing control device of claim 5, wherein the usable media path is configured to feed a properly oriented one of the at least one media sheet to the sheet-fed device.

7. A sheet-fed device comprising:
- an input tray configured to hold a plurality of media sheets;
- a media-inverting duplexing path; and
- media sensing circuitry for receiving a media sheet from the input tray and configured to determine print-impairing characteristics on the media sheet and to convey the media sheet to the media-inverting duplexing path in response to determining one or more print-impairing characteristics on the media sheet.

8. The sheet-fed device of claim 7, wherein the media sensing circuitry is configured to detect on a side of the media sheet at least one of an amount and location of the print-impairing characteristics of a previous printing to determine a usable side of the one media sheet.

9. The sheet-fed device of claim 8, wherein the sensing circuitry is further configured to direct inversion of the media sheet to an opposite side to determine a usable side when detected.

10. The sheet-fed device of claim 7, further comprising an input/output device electrically coupled to the media sensing circuitry to define a threshold of the print-impairing characteristics.

11. A method for qualifying media for use with a sheet-fed device, the method comprising:
- selecting a media sheet from an input tray;
- transporting the media sheet past sensing circuitry;

collecting data from the sensing circuitry;

analyzing the data according to print-impairing characteristics;

routing the media sheet to a usable media path when the data from either side of the media sheet qualifies the media sheet for use by the sheet-fed device; and routing the media sheet to a media-inverting duplexing path when the data from a first side of the media sheet fails to qualify the media sheet.

12. The method of claim 11, further comprising routing the media sheet to an unusable media path when data from both sides of the media sheet fails to qualify the media sheet for use by the sheet-fed device.

13. The method of claim 11, wherein analyzing the data comprises determining one of an amount and location of the print-impairing characteristics on the media sheet.

14. The method of claim 11, wherein analyzing the data comprises:

selecting a threshold of the print-impairing characteristics; and comparing the analyzed data to the threshold of the print-impairing characteristics.

15. The method of claim 11, wherein routing the media sheet comprises performing an imaging process on the media sheet.

16. A method for qualifying media sheets, the method comprising:

sensing for a first presence of previous printing characteristics on a first side of a media sheet;

routing the media sheet to a usable media path when the first presence is less than an unusable threshold;

inverting the media sheet to a second side when the first presence exceeds the unusable threshold;

sensing for a second presence of previous printing characteristics on a second side of the media sheet;

routing the media sheet to the usable media path when the second presence is less than the unusable threshold; and routing the media sheet to an unusable media path when the second presence exceeds the unusable threshold.

17. The method of claim 16, wherein sensing comprises determining one of an amount and location of a previous printing on one of at least the first and the second sides of the media sheet.

18. The method of claim 16, wherein the unusable threshold includes one of an amount and location of a previous printing on the media sheet.

19. The method of claim 18, wherein the routing of the media sheet when one of the first and second presence exceeds the unusable threshold may be overridden by a user.

20. The method of claim 16, wherein the routing of the media sheet when one of the first and second presence exceeds the unusable threshold may be rerouted to the usable media path when adequate space exists on one of the first or second sides of the media sheet to resize a prospective printed image on the media sheet.

* * * * *

UNITED STATES PATENT AND TRADEMARK OFFICE

CERTIFICATE OF CORRECTION

PATENT NO. : 7,145,164 B2
APPLICATION NO. : 10/693387
DATED : December 5, 2006
INVENTOR(S) : D. Travis Lay et al.

It is certified that error appears in the above-identified patent and that said Letters Patent is hereby corrected as shown below:

In column 6, line 32, in Claim 4, delete “muting” and insert -- routing --, therefor.

In column 8, line 19, in Claim 19, delete “claim 18,” and insert -- claim 16, --, therefor.

Signed and Sealed this

Ninth Day of December, 2008

JON W. DUDAS
*Director of the United States Patent and Trademark Office*